June 19, 1923.

D. E. LEWELLEN.

1,459,679

OILING DEVICE

Filed July 14, 1921

INVENTOR.
DARCY E. LEWELLEN.
BY
ATTORNEY.

Patented June 19, 1923.

1,459,679

UNITED STATES PATENT OFFICE.

DARCY E. LEWELLEN, OF COLUMBUS, INDIANA, ASSIGNOR TO LEWELLEN MANUFACTURING COMPANY, OF COLUMBUS, INDIANA, A CORPORATION OF INDIANA.

OILING DEVICE.

Application filed July 14, 1921. Serial No. 484,692.

*To all whom it may concern:*

Be it known that I, DARCY E. LEWELLEN, a citizen of the United States, residing at Columbus, in the county of Bartholomew and State of Indiana, have invented certain new and useful Improvements in Oiling Devices, of which the following is a specification.

This invention relates to improvements in oiling devices, and of that class primarily used for oiling bearings, and is shown in the present instance as used in connection with the bearings of variable speed mechanisms, the prime feature of the invention being the provision of means for simultaneously lubricating a combined radial and lateral thrust bearing.

A further feature of the invention is in so constructing the lubricating means that it will automatically dispense the oil onto the parts of the bearing in uniform quantities; and a further feature of the invention is the provision of means for gathering the lubricant after it has been dispensed onto the bearing part and return the same to the dispensing mechanism, thereby creating a constant circulation of the lubricant through the bearing and the lubricant dispensing mechanism.

Other objects and advantages will be hereinafter more fully set forth and pointed out in the accompanying specification.

In the accompanying drawings

Figure 1:
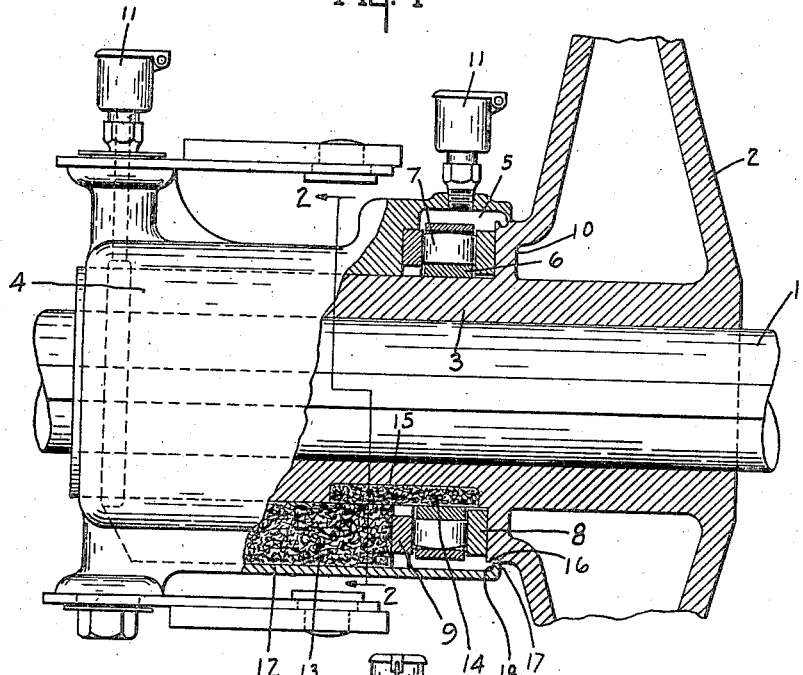
Figure 1 is a detailed side elevation of the bearing portion of a variable speed transmission disk with parts shown in section.
Figure 2:
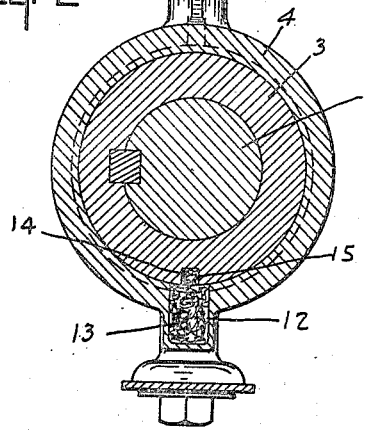
Figure 2 is a sectional view thereof as seen on line 2—2 Figure 1.
Figure 3:
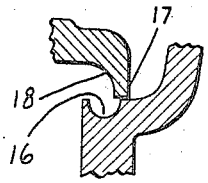
Figure 3 is an enlarged detailed sectional view showing means for creating a force feed within the bearing.

Referring to the drawings, 1 indicates a shaft upon which is mounted the usual, or any preferred form of transmission disk 2, such as is used in connection with variable speed driving elements, the disk 2 having a hub 3 integral therewith, and extending laterally therefrom and preferably splined to the shaft 1, so that the disk may have longitudinal movement with respect to said shaft but will be caused to rotate therewith.

In the present form of device a housing 4 is entered over the hub 3, and at its inner end is provided with a circumferential cavity 5, in which is located a thrust bearing 6, the rollers 7 of said bearing having engagement with friction plates 8 and 9, bearing respectively against a shoulder 10 on the transmission disk 2 and the end wall of the cavity 5, the housing 4 being so mounted upon the hub that it will move with the hub although non-rotatable; consequently the hub has a radial bearing within the housing.

Means may be provided for introducing lubricant into the housing 4, such as oil cups 11, or, if preferred, but a single oil cup may be used, which is preferably mounted upon that portion of the housing having the cavity 5 therein, so that the lubricant will enter said cavity.

To more evenly and uniformly distribute the lubricant over the radial bearing portion of the hub and housing, as well as over the lateral thrust bearing parts, a reservoir 12 is formed lengthwise of the housing 4 at a point below the shaft 1 and hub 3, said reservoir having direct communication with the periphery of the hub, so that the lubricant may come in direct contact with the face of the hub as the hub rotates. The reservoir 12 is given a fountain feed effect by placing therein a strip of porous substance 13, preferably of woven fabric, although there are other absorbent substances that may be used for absorbing and gradually feeding the lubricant onto the face of the hub.

As the thrust bearing is so positioned that the strip 13 cannot be extended into the path of the thrust bearing, an additional strip of porous substance 14 is entered in a recess 15 in the peripheral face of the hub 3, one end of the strip 14 projecting in the path of the inner end portion of the strip 13, while the opposite end thereof extends across the path of the thrust bearing 6, the strip 14 being preferably of less porosity than the strip 13, for better regulating the flow of the lubricant from the strip 13 through the strip 14 onto the thrust bearing. By arranging lubricant feeding strips in this manner the lubricant will be gradually and uniformly fed onto the radial, as well as the thrust bearing surface, so that said surfaces will be automatically lubricated, the lubricant having a constant flow so long as the hub is rotated.

In order to create a circulation of the lubricant and provide a substantially force pump action, a circumferential groove 16 is formed in the peripheral face of the shoulder 10, which will act to collect and throw the lubricant onto the inner face wall of the cavity 5, from whence it will descend into the lowermost portion of the cavity, in line with the reservoir 12, the centrifugal force created by the rotation of the disk causing the lubricant to flow towards and enter the porous strip 13, while a suction action on the strip 13 will be created by the revolution of the hub 3, thereby aiding in drawing the lubricant through the porous strip 13 and onto the bearing surface.

To more fully guard against the lubricant escaping from the inner end of the housing, an inwardly extending lip 17 is formed at the outer end of the cavity 5, the edge of the lip terminating adjacent the peripheral edge of the shoulder 10, and partially overhanging groove 16. The inner face of the lip 17 at its point of union with the wall of the cavity 5, is preferably curved as shown at 18, so that the lubricant will more readily flow away from the lip 17, and by extending the lip inwardly a distance as shown the lubricant will not escape between the edge of the lip and the shoulder adjacent which it terminates, said lip acting as a retaining wall for the lubricant.

Having thus fully described my said invention, what I claim as new and desire to secure by Letters Patent, is:

1. The combination with the hub of a variable speed transmission disk, of a thrust bearing housing surrounding said hub, an antifriction thrust bearing comprising a pair of continuous washers of relatively hard material and antifriction members between said washers, a lubricant reservoir in said housing, and means for distributing the lubricant therefrom over said bearing faces.

2. The combination with a combined radial and thrust bearing, having a reservoir therein, of a fibrous material in said reservoir for dispensing the lubricant onto the bearing parts at a uniform flow, and means for collecting and returning the lubricant to said reservoir, and causing the same to circulate through the fibrous material.

3. The combination with the hub of a variable speed transmission disk, and a combined radial and end thrust bearing mounted on said hub, said bearing having a lubricant reservoir therein, of a fibrous substance within said reservoir adapted to distribute the lubricant over the face of the radial bearing surface.

4. The combination with the hub of a variable speed transmission disk, and a combined radial and end thrust bearing mounted on said hub, said bearing having a lubricant reservoir therein, of a fibrous substance within said reservoir adapted to distribute the lubricant over the face of the radial bearing surface, and means carried by said hub for collecting the lubricant from the fibrous substance and distributing the same over the end thrust bearing.

5. The combination with a variable speed transmission disk having an elongated hub projecting from one face thereof, of a housing surrounding said hub, a thrust bearing encased within said housing, comprising a pair of continuous washers of relatively hard material with antifriction members therebetween, a lubricant reservoir in said housing, and means for circulating the lubricant through the bearing and returning it to the reservoir.

6. The combination with the hub of a variable speed transmission disk, of a housing surrounding said hub, said housing having an enlarged end in which is formed a circumferential cavity and a lubricant reservoir communicating with the cavity, a thrust bearing enclosed in said circumferential cavity, and an inwardly projecting flange for retaining the lubricant within the housing and returning it to the reservoir.

7. The combination with the hub of a variable speed transmission disk, of a housing surrounding said hub and having an enlarged end in which is formed a circumferential cavity, said housing also having a reservoir opening at one end into said circumferential cavity for returning lubricant from the cavity into said reservoir.

In witness whereof, I have hereunto set my hand and seal at Indianapolis, Indiana, this 11th day of July, A. D. nineteen hundred and twenty-one.

DARCY E. LEWELLEN. [L. S.]

Witnesses:
CAREY S. FRYE,
HANNAH M. BRADFORD.